United States Patent [19]

Davis, Jr.

[11] 4,049,836

[45] Sept. 20, 1977

[54] PIE CRUST, DOUGH AND PACKAGE

[76] Inventor: George B. Davis, Jr., 7512 Marbury Road, Bethesda, Md. 20034

[21] Appl. No.: 677,713

[22] Filed: Apr. 16, 1976

Related U.S. Application Data

[63] Continuation-in-part of Ser. No. 498,575, Aug. 19, 1974, abandoned.

[51] Int. Cl.² .............................................. A21D 10/02
[52] U.S. Cl. ................................... 426/112; 426/115; 426/122; 426/12 E
[58] Field of Search ............. 426/106, 112, 115, 11 E, 426/122, 128, 152, 157, 390–395, 410, 411, 413, 414, 496, 502, 512, 517; 53/3, 13, 21 R, 29; 229/DIG. 14

[56] References Cited

U.S. PATENT DOCUMENTS

| 2,545,243 | 3/1951 | Rumsey, Jr. | 229/DIG. 14 X |
| 2,699,738 | 1/1955 | Brittain | 426/496 X |
| 3,081,174 | 3/1963 | Gay | 229/DIG. 14 X |
| 3,625,348 | 12/1971 | Titchenal et al. | 426/415 X |

FOREIGN PATENT DOCUMENTS

| 6,502,210 | 8/1966 | Netherlands | 229/DIG. 14 |
| 319,541 | 9/1929 | United Kingdom | 229/DIG. 14 |

Primary Examiner—William A. Cuchlinski, Jr.

[57] ABSTRACT

This invention relates to a package of prepared piecrust dough that may be required to remain within its package for relatively long periods of time and within which thereafter the dough may be rolled into piecrust form while still in its packaging receptacle.

20 Claims, 7 Drawing Figures

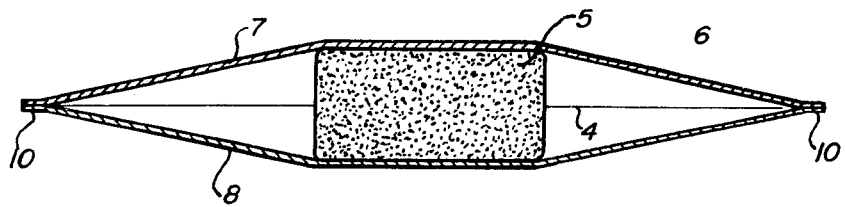
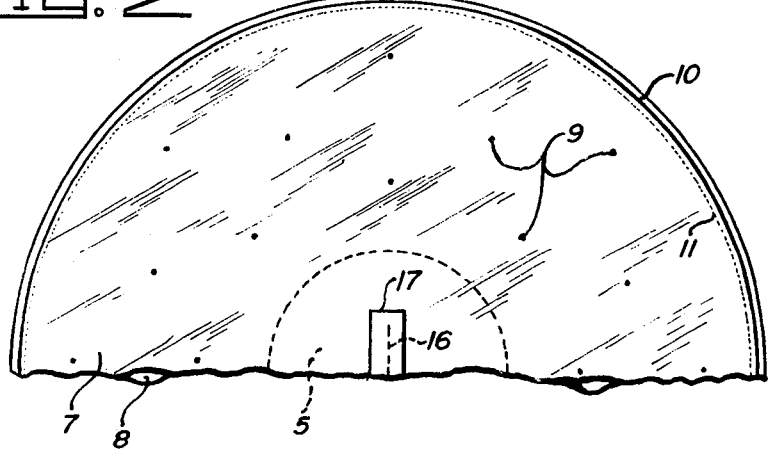
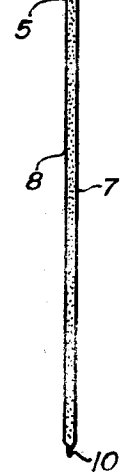
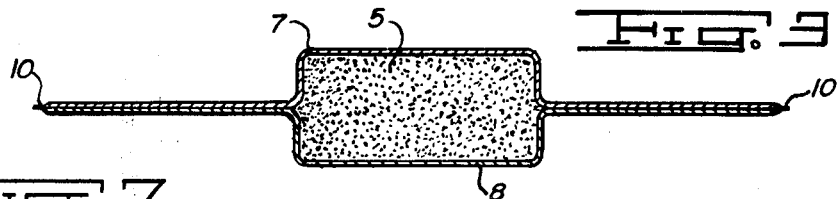
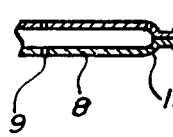
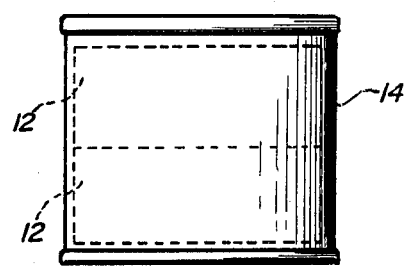
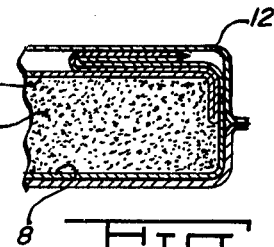

PIE CRUST, DOUGH AND PACKAGE

This application is a continuation in part of application Ser. No. 498,575, filed Aug. 19, 1974, now abandoned.

When packaging prepared piecrust dough that is of the consistency suitable for shaping into piecrust form by rolling, it is highly desirable that the dough be compacted into its smallest practical mass and so inclosed that the least surface of the dough is exposed to air or to the material of the packaging container. Not only does such a compacted dough mass offer the advantages of being easily handled, stored, and shipped, but after rolling retains more of the texture of freshly prepared dough.

In order to provide that the package inclosing the dough mass further serves as a dough forming receptacle and wherein the dough mass may remain and be rolled into piecrust form, it is also highly desirable that the package be so constructed or assembled about the dough mass that the sealed edges of the receptacle lie within a plane extending substantially centrally through the dough mass to assure that the sides of the receptacle are symmetrical in size thusly assuring that the dough within the receptacle will roll out easily into crust form without wrinkles or irregularities in its surface or configuration.

It is an object of the present invention to provide a package of prepared piecrust dough whereby the dough, still in the packaging receptacle may be rolled into piecrust form.

Another object is to provide a package of piecruft dough whereby the dough within the package will remain in such a ductile and pliable state that when rolled, the dough will assume the configuration of the forming receptacle and retain substantially all the quality of freshly prepared dough.

A further object is to provide a package of piecrust dough wherein after the pastry dough mass has been rolled into piecrust from within the packaging receptacle the sealed edge of the dough retaining receptacle may be torn free to separate and thereby open the receptacle for removing the rolled crust.

A still further object is to provide a package of piecrust dough wherein the dough may be compacted into its smallest practical mass for shipment, storage, and handling, yet by reason of the package structure be readily rolled into crust form while still contained within its packaging receptacle.

To more fully understand the merits and advantages of the package described herein, reference is now directed to the description as reviewed in the light of the accompanying drawing wherein:

FIG. 1 is a view in cross section through the receptacle of the package and inclosed dough mass therein before removal of the air from within the receptacle.

FIG. 2 is a sectional plan view of the receptacle and showing the arrangement of the air venting ports or punctures therein.

FIG. 3 is a view in cross section through the receptacle containing the dough mass with the edges of the receptacle extended before rolling the dough mass into piecrust form.

FIG. 4 is a view in cross section of the receptacle of FIG. 3 with the dough mass therein rolled into piecrust form.

FIG. 5 is a fragmentary cross sectional view of the dough mass and retaining receptacle therefor as compacted within a closely fitting container therefor.

FIG. 6 is a view in elevation of the external container wherein is shown two of the packages of FIG. 5 stored therein for handling, shipping, and distributing.

FIG. 7 is a fragmentary view in cross section through an alternate peripheral seal wherein the material extending outwardly from the seal is removed beyond the seal after or concurrently with the sealing operation.

Referring now to FIG. 1 wherein is shown in cross section a prepared mass of pastry dough 5 such as used for the forming of piecrust or the like and about which is extended an inclosing receptable 6. The receptacle 6 is constructed of thinly formed sheets 7 & 8 of preferably transparent heat sealable plastic that are suitably secured about their periphery as at 12 to inclose the dough mass 5. When forming the receptacle 6, it is highly desirable that sheets 7 & 8 be extended tightly and uniformly outwardly from the dough mass and with the sheets then being brought together and secured together along a plane extending substantially centrally through the dough mass as shown by the seal line 4 to thusly forming an inclosure about the dough mass having sides of substantially the same size and configuration thereby assuring that the dough therein will roll out evenly and smoothly into piecrust form without wrinkles or irregularities in shape or thickness.

Extending through the sheets 7 & 8 are a plurality of air admitting and venting ports or punctures 9, FIG. 2, which allows the air to be removed from the receptacle during the packaging process and which allows air to enter the receptacle as the edges of the receptacle are extended prior to the rolling operation. These ports or punctures may extend in any manner or arrangement into the receptacle the requirement being that they remain sufficiently small as to allow the passage of air into and from the receptacle without allowing the viscous dough material extruding excessively from the receptacle through these ports during a normal dough rolling operation and during such time as relatively high pressures are applied to the dough within the receptacle.

These air venting ports 9 could be in the form of a line of closely spaced punctures 11 extending about the outer periphery of the receptacle and in close spaced adjacency to the seal edge thereof thereby to sufficiently weaken the receptacle at the punctures as to allow the sealed edge of the receptacle being torn free to open the receptacle upon completion of the rolling operation. Since the rolling pressure upon the dough is the greatest along the edge of the receptacle, these separating punctures should be properly spaced as to prevent rupture of the form from internal pressure as applied from the rolled dough.

FIG. 3 is a cross sectional view through the receptacle and dough mass after removal of the air therefrom by way of the ports and which operates as shown, to bring the inner surfaces of the extending edges of the receptacle together and closely about the dough mass. The air within the receptacle may be removed in any suitable manner as by pressing the air from the receptacle by way of venting ports 9 or 11 or by reducing the atmospheric pressure about the outer surface of the receptacle sufficiently as to collapse the receptacle closely about the dough mass as illustrated in FIG. 3. With the air removed from the receptacle the extending edges of the receptacle may be then folded, as in FIG.

5, about the dough mass or otherwise compacted for inclosing within a closely fitting container such as 12 or as shown by a container such as in FIG. 6.

If desired, a dough mass sufficient for the forming of a single piecrust such as in FIG. 5 may then be inclosed within a second closely fitting container such as 14, FIG. 6, for handling and shipment.

While the container 14 is herein shown as including two packets of piecrust dough for making a two piecrust pie, the individual packaging structure of each dough mass, such as shown in FIG. 5, is of such a nature as to maintain the freshness of the dough even if the outer container 14 is opened and only one dough packet is removed as for making a single crust pie. The remaining package can be stored while refrigerated and will thusly retain its freshness for relatively long periods of time.

While as in FIG. 1 is shown the dough mass 5 as centrally positioned within a receptacle that has been constructed about the dough mass, it may be desired to first seal closed the receptacle while leaving therein a dough admitting opening or port 16 through which the dough may be subsequently admitted or by puncturing a sheet of the receptacle and the dough extruded between the sheets of the receptacle. To maintain freshness, it is preferable in either instance that the dough admitting port into the receptacle be subsequently closed as by a strip or patch of adhesive tape such as 17. Such a receptacle must include the necessary air venting ports 9 or 11 through which the air within the receptacle is then removed and the receptacle compacted and packaged as hereinbefore described.

When packaging piecrust dough of this nature, the dough mass should never extend to the sealed edge of the receptacle. It is imperative that the dough receive some degree of "working" as by rolling into final piecrust form in order to maintain the desired pliability and texture of freshly prepared dough.

While herein is shown and decribed a package of prepared piecrust dough that is to be subsequently rolled into piecrust form while still contained within its packaging receptacle, it is understood that the order of effecting and arranging the air passing ports within the receptacle may be varied without departing from the spirit and scope of the invention as herein disclosed.

What I therefor claim and desire to cover by letters patent is:

1. The package combination disclosed comprising a mass of crust dough, two thinly formed sheets of flexible material secured together about their peripheral edge to form a receptacle inclosing said dough mass significantly larger than the dough mass to provide for reshaping by rolling the dough within the receptacle, means forming air passing ports extending into said receptacle for the passage of air into and from the receptacle as the receptacle is extended and the dough therein rolled into pie crust form said air passing ports being sufficiently small
    as to allow the passing of air into and from the receptacle without allowing the viscus dough material extruding excessively from the receptacle through the ports during a normal dough rolling operation and during such time as relatively high pressure are applied to the dough within the receptacle.
2. A package combination as claimed in claim 1 wherein the receptacle is caused to bear closely about the dough mass until the receptacle is extended from the dough mass for reshaping of the dough mass therein into crust form.
3. The package combination as claimed in claim 1 wherein at least one of said sheets is transparent.
4. The package combination as claimed in claim 1 wherein both of said sheets are transparent.
5. The package combination as claimed in claim 1 wherein the sheets forming the dough inclosing receptacle are circular in form.
6. The package combination as claimed in claim 1 wherein the means forming the air passing ports are in the form of a plurality of punctures extending through the material of at least one of said sheets.
7. The package combination as claimed in claim 1 wherein said air passing ports are in the form of closely spaced punctures internally disposed in close adjacency with respect to the sealed edge of said receptacle to weaken the edge of the receptacle in a manner to assist separation of the sheets of the receptacle along said closely spaced punctures.
8. The package combination as claimed in claim 1 wherein the said dough mass within the receptacle is significantly smaller than said receptacle whereby the dough mass, while within the receptacle, may be reshaped by rolling into the configuration of the receptacle.
9. The package combination disclosed comprising a mass of prepared crust dough to be reshaped by rolling within its packaging receptacle into crust form, two thinly formed sheets of flexible material secured together adjacent their peripheral edge to form a receptacle inclosing said dough mass with said receptacle being significantly larger than the dough mass to allow movement and reshaping of the dough mass within the receptacle, means forming air passing ports extending into said receptacle for passing air into and from said receptacle as said receptacle is extended and the dough therein rolled into crust form said ports being sufficiently small as to allow the passing of air into and from the receptacle without allowing the viscus dough material extruding excessively from the receptacle through these ports during a normal dough rolling operation and during such time as relatively high pressures are applied to the dough within the receptacle.
10. A package combination as claimed in claim 9 wherein the receptacle is caused to bear closely about the dough mass until the receptacle is extended for the reshaping of the dough mass therein into crust form.
11. The package combination as claimed in claim 9 wherein at least one of said sheets is transparent.
12. The package combination as claimed in claim 9 wherein both of said sheets are transparent.
13. The package combination as claimed in claim 9 wherein the sheets forming the dough inclosing receptacle are circular in form.
14. The package combination as claimed in claim 9 wherein the means forming the air passing ports are in the form of punctures extending through the material of at least one of said sheets.
15. The package combination as claimed in claim 9 wherein the said air passing ports are in the form of closely spaced punctures internally disposed in close adjacency with respect to the sealed edge of said receptacle to weaken the edge of the receptacle in a manner to assist separation of the sheets of the receptacle along said closely spaced punctures.
16. The package combination as claimed in claim 9 wherein the said dough mass is significantly smaller than said receptacle whereby the dough mass within the receptacle may be reshaped by rolling within the receptacle into pie crust form.

17. A package combination including a prepared dough mass, a waffer-like receptacle significantly larger than the dough mass inclosing said dough mass and comprised of thinly formed sheets of transparent flexible plastic secured together in a manner to define by their secured together surfaces the configuration of said receptacle, means forming air passing ports extending into said receptacle and operative to pass air into said receptacle as the edge of said receptacle is extended from said dough mass and to pass air from said receptacle as said dough mass is rolled within the receptacle into crust form and with said air passing ports being sufficiently small as to allow the passage of air into and from the receptacle without allowing the viscus dough extruding excessively from the receptacle through these ports during a normal dough rolling operation and during such time as relatively high pressures are applied to the dough within the receptacle.

18. A package combination as claimed in claim 17 wherein said waffer-like receptacle is formed by sheets of plastic film of substantially the same size and configeration being secured together about their edges to inclose said dough mass.

19. A package combination as claimed in claim 17 wherein said ports extending into said receptacle are formed as air passing punctures extending through the plastic of said receptacle.

20. A package combination as claimed in claim 17 wherein said air passing ports are disposed an inner close adjacency to the edge of said receptacle.

* * * * *